United States Patent
Costello (10) Patent No.: US 10,487,861 B2
(45) Date of Patent: Nov. 26, 2019

(54) STRAINER ASSEMBLY FOR A FLUID TANK

(71) Applicant: Caterpillar SARL, Geneva (CH)

(72) Inventor: Daniel Costello, Fuquay Varina, NC (US)

(73) Assignee: Caterpillar SARL, Geneva (CH)

( * ) Notice: Subject to any disclaimer, the term of this patent is extended or adjusted under 35 U.S.C. 154(b) by 573 days.

(21) Appl. No.: 15/227,022

(22) Filed: Aug. 3, 2016

(65) Prior Publication Data

US 2018/0038394 A1 Feb. 8, 2018

(51) Int. Cl.
| | | |
|---|---|---|
| *F15B 21/041* | (2019.01) | |
| *B01D 35/027* | (2006.01) | |
| *B01D 35/30* | (2006.01) | |
| *F15B 1/26* | (2006.01) | |
| *E02F 3/34* | (2006.01) | |
| *E02F 9/08* | (2006.01) | |

(52) U.S. Cl.
CPC ........ *F15B 21/041* (2013.01); *B01D 35/0273* (2013.01); *B01D 35/30* (2013.01); *F15B 1/26* (2013.01); *B01D 2201/303* (2013.01); *B01D 2201/4015* (2013.01); *B01D 2201/4023* (2013.01); *E02F 3/3414* (2013.01); *E02F 9/0883* (2013.01)

(58) Field of Classification Search
None
See application file for complete search history.

(56) References Cited

U.S. PATENT DOCUMENTS

| | | | | |
|---|---|---|---|---|
| 1,677,118 A | * | 7/1928 | Ford | B01D 29/23 |
| | | | | 210/457 |
| 2,991,885 A | * | 7/1961 | Gutkowski | B01D 35/12 |
| | | | | 210/133 |
| 3,077,933 A | | 2/1963 | Bigelow | |
| 3,791,524 A | * | 2/1974 | Cho | A61B 10/0096 |
| | | | | 210/232 |
| 4,052,307 A | * | 10/1977 | Humbert, Jr. | B01D 27/08 |
| | | | | 210/130 |
| 4,204,960 A | * | 5/1980 | Sugiyama | B01D 29/111 |
| | | | | 210/232 |
| 4,615,812 A | * | 10/1986 | Darling | B01D 29/15 |
| | | | | 210/805 |
| 4,678,572 A | * | 7/1987 | Hehl | B01D 35/027 |
| | | | | 210/232 |
| 4,764,275 A | * | 8/1988 | Robichaud | B01D 27/005 |
| | | | | 210/232 |

(Continued)

*Primary Examiner* — Robert J Popovics
(74) *Attorney, Agent, or Firm* — Oblon, McClelland, Maier & Neustadt (57) ABSTRACT

A strainer assembly for a fluid tank is provided. The strainer assembly includes an access plate configured to cover an opening of the fluid tank. The access plate has an elongated cavity and a stopper structure provided on an inner surface of the elongated cavity. The strainer assembly further includes a strainer having a locking assembly for securing the strainer to the access plate such that the strainer is positioned inside the fluid tank. The locking assembly includes a head portion and a body portion having an engagement structure. The body portion is positioned inside the elongated cavity such that the head portion abuts the access plate and the engagement structure engages with the stopper structure to restrict an axial movement of the strainer.

18 Claims, 8 Drawing Sheets

(56) References Cited

U.S. PATENT DOCUMENTS

| | | | | |
|---|---|---|---|---|
| 4,915,831 A * | 4/1990 | Taylor | B01D 35/30 | 206/1.5 |
| 5,139,658 A * | 8/1992 | Hodge | B01D 27/08 | 210/167.01 |
| 5,196,112 A * | 3/1993 | Eichman | F01M 11/0408 | 123/196 A |
| 5,269,913 A * | 12/1993 | Atkins | B01D 29/23 | 15/1.7 |
| 5,311,939 A | 5/1994 | Pringle et al. | | |
| 5,510,023 A * | 4/1996 | Taylor | B01D 29/018 | 210/167.02 |
| 5,545,318 A * | 8/1996 | Richmond | A47L 15/4217 | 210/232 |
| 5,762,671 A * | 6/1998 | Farrow | B01D 35/306 | 210/232 |
| 5,906,221 A * | 5/1999 | Mancell | B62D 5/062 | 137/549 |
| 6,001,249 A * | 12/1999 | Bailey | C02F 1/003 | 210/232 |
| 6,633,727 B2 * | 10/2003 | Henrie | F24H 9/2021 | 392/497 |
| 6,858,134 B2 * | 2/2005 | Yates | B01D 29/21 | 210/167.01 |
| 6,998,043 B2 | 2/2006 | Fischer et al. | | |
| 7,354,511 B2 * | 4/2008 | Becker | B01D 35/0276 | 137/544 |
| 7,387,726 B2 * | 6/2008 | Wolf | B01D 29/055 | 210/232 |
| 7,459,078 B2 * | 12/2008 | Klein | B01D 29/96 | 210/234 |
| 8,240,332 B1 * | 8/2012 | Matusek | B01D 35/027 | 123/509 |
| 8,268,170 B2 * | 9/2012 | Core | B01D 29/21 | 210/232 |
| 8,496,821 B2 * | 7/2013 | Ringenberger | B01D 29/111 | 210/232 |
| 8,974,569 B2 * | 3/2015 | Matula | A61M 13/003 | 210/295 |
| 9,470,193 B2 * | 10/2016 | Ries | F02M 37/22 | |
| 9,486,725 B2 * | 11/2016 | Ries | B01D 35/0276 | |
| 10,328,366 B2 * | 6/2019 | Hudgens | B01D 35/027 | |
| 2004/0118761 A1 * | 6/2004 | Yates | B01D 29/21 | 210/172.4 |
| 2009/0166301 A1 * | 7/2009 | Ringenberger | B01D 29/111 | 210/767 |
| 2012/0312759 A1 * | 12/2012 | Ries | F02M 37/22 | 210/806 |
| 2013/0193083 A1 * | 8/2013 | Kamp | B01D 35/30 | 210/767 |
| 2014/0224215 A1 * | 8/2014 | Lehman | F02M 37/22 | 123/446 |
| 2014/0230315 A1 * | 8/2014 | Ries | B01D 35/005 | 44/300 |
| 2014/0231366 A1 * | 8/2014 | Ries | B01D 35/0276 | 210/806 |
| 2014/0284286 A1 * | 9/2014 | Ries | F02M 37/22 | 210/808 |
| 2015/0041153 A1 | 2/2015 | Moore et al. | | |
| 2016/0339370 A1 * | 11/2016 | Hudgens | B01D 35/027 | |
| 2018/0038394 A1 * | 2/2018 | Costello | F15B 21/041 | |

* cited by examiner

STRAINER ASSEMBLY FOR A FLUID TANK

TECHNICAL FIELD

The present disclosure relates to a strainer assembly. More particularly, the present disclosure relates to a strainer assembly for a fluid tank assembly.

BACKGROUND

A machine may include a hydraulic drive system for powering various parts, such as, implements of the machine. A typical hydraulic drive system includes a fluid tank for storing the fluid which is supplied to power the various parts of the machine through use of a pump. An access plate may be secured on a fluid tank opening through which the fluid may be accessed from within the fluid tank via one or more hose connections.

It is commonly known to provide a fluid strainer upstream of the pump inlet, in order to filter the fluid before it is provided to the pump and subsequently to the various parts of the machine. The fluid strainer may be secured at an outer portion of the access plate using an additional threaded O-ring type connection.

U.S. Pat. No. 6,998,043 (hereinafter referred to as the '043 patent) relates to a fuel strainer assembly that includes a filtration member and an inlet connector connected to the filtration member for connection to an inlet of a fuel pump. The fuel strainer assembly further includes a locking mechanism operatively supported by the inlet connector to operatively engage a shell of the fuel pump and secure the inlet connector to the fuel pump. However, the '043 patent does not describe a solution pertaining to a fluid strainer.

SUMMARY

According to an aspect of the present disclosure, a strainer assembly for a fluid tank is provided herein. The strainer assembly includes an access plate configured to cover an opening of the fluid tank. The access plate has an elongated cavity and a stopper structure provided on an inner surface of the elongated cavity. The strainer assembly further includes a strainer having a locking assembly for securing the strainer to the access plate such that the locking assembly is positioned inside the fluid tank. The locking assembly includes a head portion and a body portion having an engagement structure. The body portion is positioned inside the elongated cavity such that the head portion abuts the access plate and the engagement structure engages with the stopper structure to restrict an axial movement of the strainer.

According to another aspect of the present disclosure, a fluid tank assembly is provided herein. The fluid tank assembly includes a fluid tank, an access plate and a strainer. The access plate is secured to cover an opening of the fluid tank. The access plate includes an elongated cavity and a stopper structure provided on an inner surface of the elongated cavity. The strainer is positioned inside the tank. The strainer has a locking assembly for securing the strainer to an inner portion of the access plate such that the locking assembly is positioned inside the fluid tank. The locking assembly includes a head portion and a body portion having an engagement structure extending radially from an outer surface of the body portion. The body portion is positioned inside the elongated cavity such that the head portion abuts the inner portion of the access plate and the engagement structure engages with the stopper structure to restrict an axial movement of the strainer with respect to the access plate.

According a yet another embodiment of the present disclosure, a strainer assembly for a fluid tank is provided herein. The strainer assembly includes an access plate configured to cover an opening of the fluid tank. The access plate includes an elongated cavity and a stopper structure provided on an inner portion of the elongated cavity. The stopper structure further includes a first stopper member and a second stopper member being angularly positioned with respect to each other to form a retainer structure. The strainer assembly further includes a strainer having a locking assembly for securing the strainer to an inner portion of the access plate such that the locking assembly is positioned inside the fluid tank. The locking assembly includes a head portion and a body portion having an engagement structure extending radially from an outer surface of the body portion. The body portion is positioned inside the elongated cavity such that the head portion abuts the inner portion of the access plate and the engagement structure engages with the retainer structure of the stopper structure to restrict an axial movement of the strainer with respect to the access plate.

DETAILED DESCRIPTION

Figure 1:
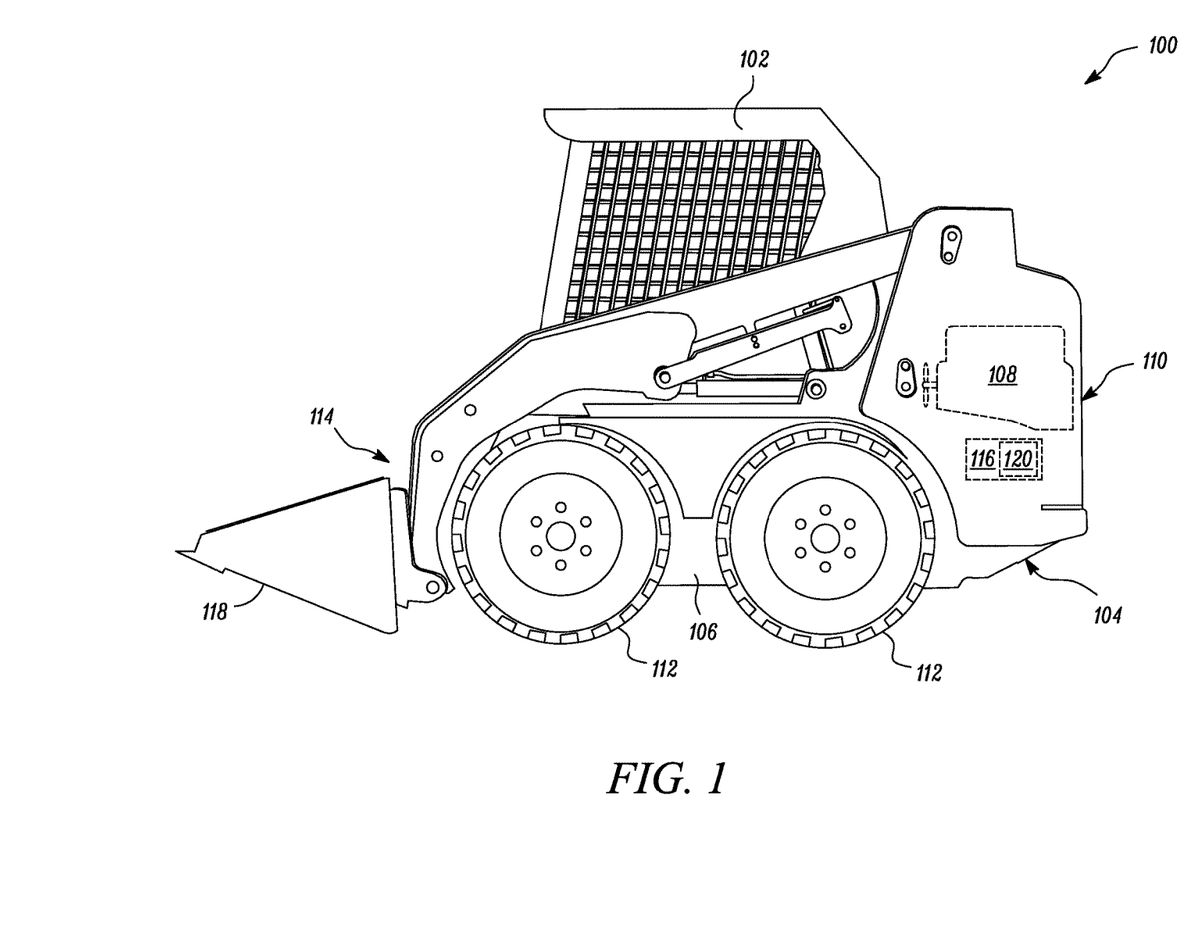
FIG. 1 illustrates an exemplary machine having a hydraulic drive system.

FIG. 1 illustrates an exemplary machine 100 in the form of a skid steer loader. The machine 100 may alternatively be any surface altering machine such as a hydraulic excavator, backhoe loader, dozer, etc. The machine 100 includes an operator cab 102 supported on a frame assembly 104 including a frame 106. The frame 106 may also support an engine 108, which in the illustrated embodiment is at a rear end 110 of the frame 106. The machine 100 is propelled by a set of drive wheels 112 (only one side of drive wheels shown in FIG. 1) provided on each side of the machine 100. The machine 100 further includes a hydraulically powered work implement system 114 and a hydraulic drive system 116 to operate the work implement system 114.

The work implement system 114 may include a work implement 118 which performs alterations work at a worksite. The work implement 118 may include buckets, augers, blades, brooms, forks, grapples, hammers, etc. The work implement system 114 may further include members and linkages, as well as a control system to actuate the members and the linkages to maneuver the work implement 118. The operator cab 102 may include an operator interface (not shown) operable to generate commands for the control system to maneuver the work implement 118.

The hydraulic drive system 116 includes a fluid tank assembly 120 for supplying fluid, such as hydraulic fluid, to the work implement system 114. The fluid tank assembly 120 is explained in further detail with reference to FIG. 2 through FIG. 5C.

Figure 2:
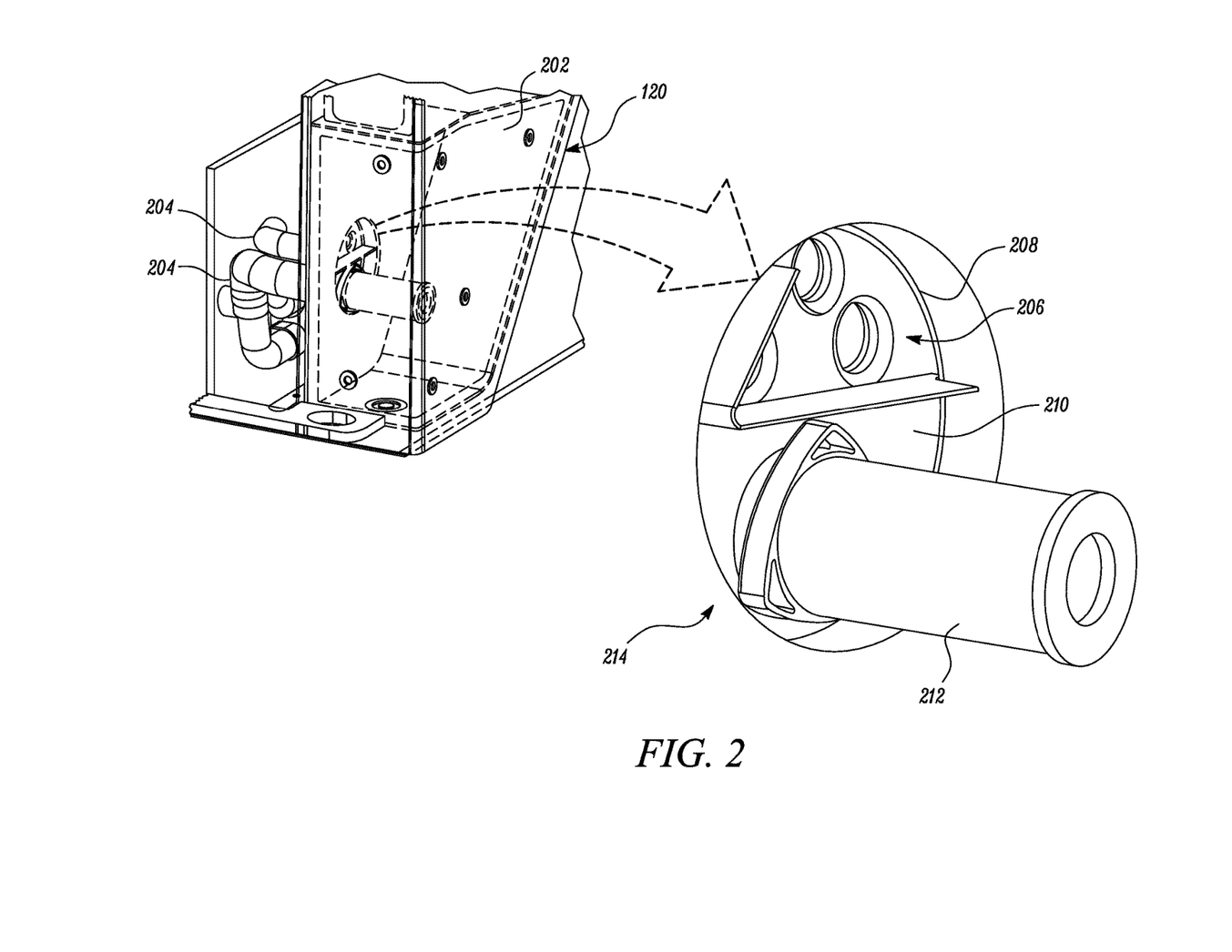
FIG. 2 illustrates a perspective view of a hydraulic fluid tank assembly.

FIG. 2 illustrates the fluid tank assembly 120 according to an embodiment of the present disclosure. The fluid tank assembly 120 includes a fluid tank 202 for storing fluid therein, which fluid may be supplied to power the various parts of the work implement system 114. A fluid pump (not shown) may be configured to pump the fluid from within the fluid tank 202 to the various parts of the work implement system 114 via one or more hoses 204.

The hoses 204 may fluidly connect the various linkages and members of the work implement system 114 with the fluid tank 202. The hoses 204 may be secured to an access plate 206 which is secured to cover an opening 208 of the fluid tank 202. As shown in FIG. 2, the access plate 206 is circular in shape. However, the shape of the access plate 206 is merely exemplary and may be varied without deviating from the scope of the claimed subject matter.

The access plate 206 has an inner portion 210 positioned inside the fluid tank 202 and an outer portion 302 (shown in FIG. 3B) positioned outside the fluid tank 202. The hoses 204 may be secured to the outer portion 302 of the access plate 206. The fluid supply from the fluid tank 202 through the hydraulic fluid pump to the various parts of the work implement system 114 may be done in a conventional manner.

The fluid tank assembly 120 includes a fluid strainer 212 (hereinafter referred to as the strainer 212) secured to the inner portion 210 of the access plate 206. The strainer 212 is positioned inside the fluid tank 202. For example, the strainer 212 is positioned upstream of the fluid pump to filter the fluid within the fluid tank 202 before the fluid is directed to the fluid pump and subsequently to the work implement system 114 via the one or more hoses 204. The strainer 212 includes a locking assembly for securing the strainer 212 to the inner portion 210 of access plate 206 to form a strainer assembly 214. The strainer assembly 214 is further explained with respect to subsequent FIGS. 3A through 5C.

Figure 3A:
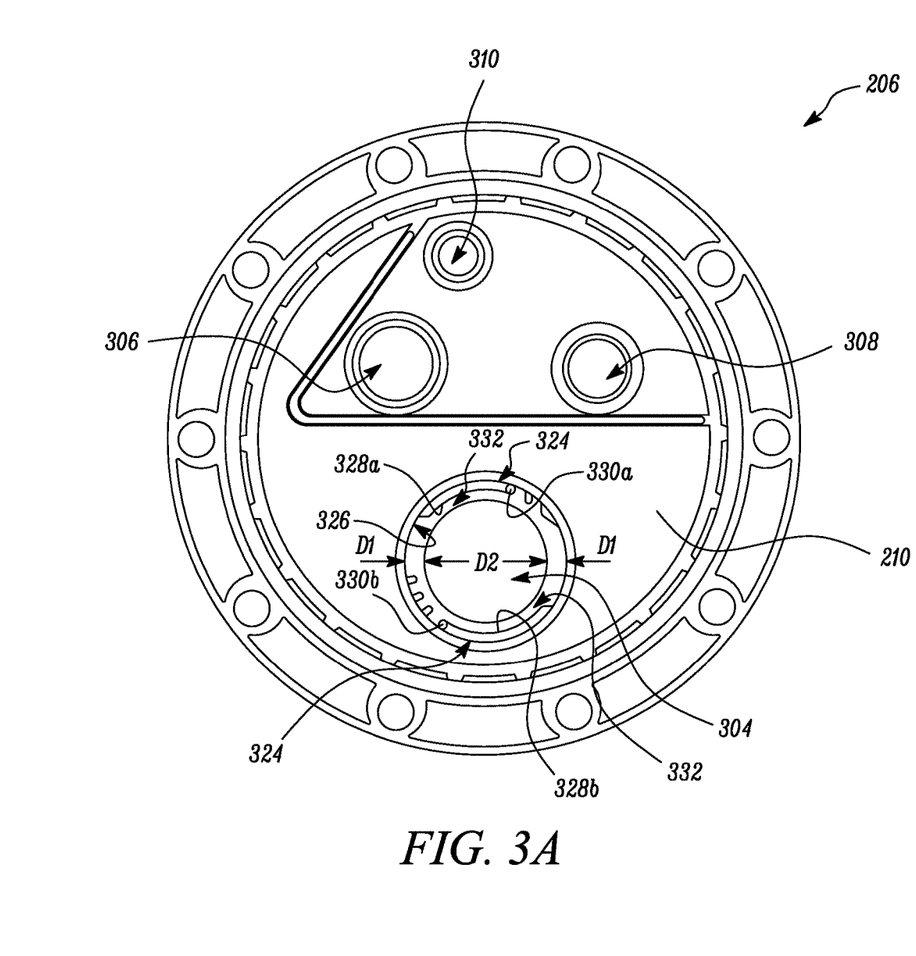
FIG. 3A illustrates a rear elevation view of an inner portion of an access plate of the hydraulic fluid tank assembly.
Figure 3B:
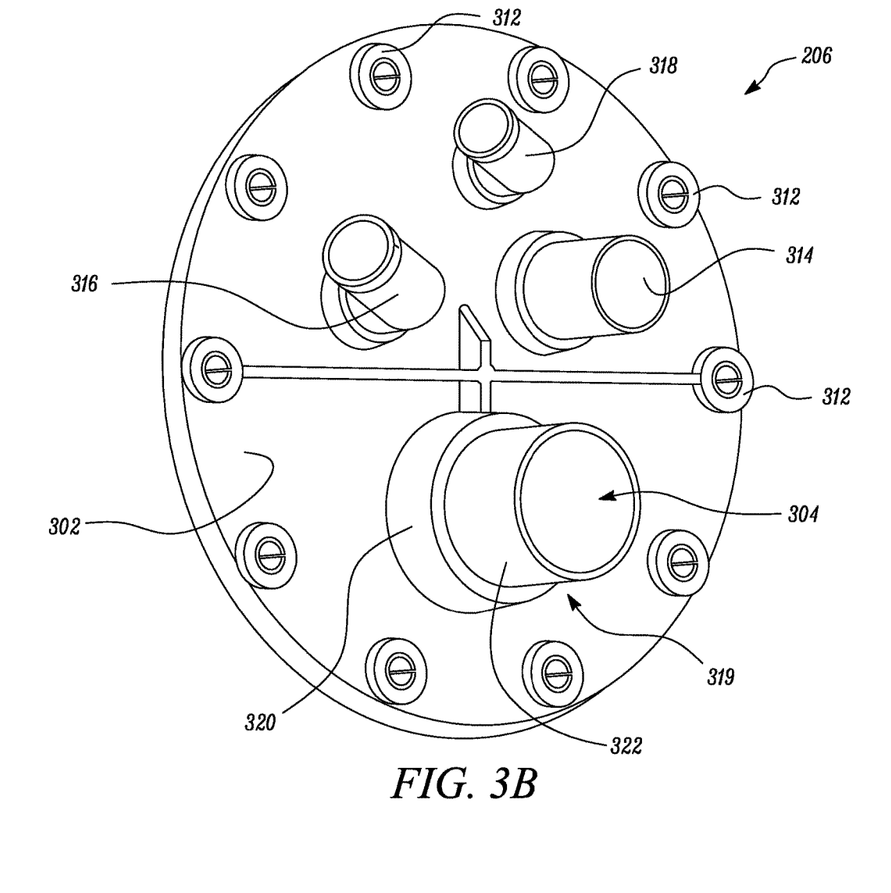
FIG. 3B illustrates a front perspective view of an outer portion of the access plate.

FIG. 3A shows the inner portion 210 of the access plate 206 and FIG. 3B shows the outer portion 302 of the access plate 206, in accordance with an embodiment of the present disclosure. The access plate 206 includes an elongated cavity 304 and a plurality of supplementary cavities 306, 308, and 310. The access plate 206 may be configured to be secured to the opening 208 of the fluid tank 202 by using a number of fastening connections 312, such as nut and bolt type fasteners.

The supplementary cavities 306, 308 and 310 may be configured to axially extend to form connectors 314, 316, and 318 respectively. The connectors 314, 316 and 318 may be configured to connect the respective hoses 204 to the outer portion 302 of the access plate 206. In an embodiment of the present disclosure, supplementary cavities 306, 308, 310 may be cylindrical in shape, however, the shape of the supplementary cavities 306, 308, and 310 is merely exemplary which may be varied.

The elongated cavity 304 may extend axially and form a connector 319 to connect one of the hoses 204 to the outer portion 302 of the access plate 206. In an exemplary embodiment, the elongated cavity 304 is shown to be cylindrical in shape, however, the shape of the elongated cavity 304 is also merely exemplary and may be varied.

The elongated cavity 304 has a first portion 320 and a second portion 322. An inner diameter D1 of the elongated cavity 304 at the first portion 320 is greater than an inner diameter D2 of the elongated cavity 304 at the second portion 322, as shown in FIG. 3A.

The access plate 206 includes a stopper structure 324 provided on an inner surface 326 of the elongated cavity 304, as shown in FIG. 3A. The stopper structure 324 includes a plurality of first stopper members 328a, 328b (collectively referred to as the first stopper members 328) circumferentially arranged on the inner surface 326 of the elongated cavity 304. For example, the stopper structure 324 includes two stopper members positioned diametrically opposite to each other on the inner surface 326 of the elongated cavity 304. Further, the stopper structure 324 includes a pair of second stopper members 330a and 330b (collectively referred to as the second stopper members 330) angularly positioned with respect to the respective first stopper members 328a and 328b, as shown in FIG. 3A. The first stopper members 328 and the second stopper members 330 are positioned such that they form respective retainer structures 332. In an embodiment of the present disclosure, the first stopper members 328 and the second stopper members 330 may be in the form of protruded portions positioned perpendicular to each other so as to form the retainer structures 332.

Figure 4:
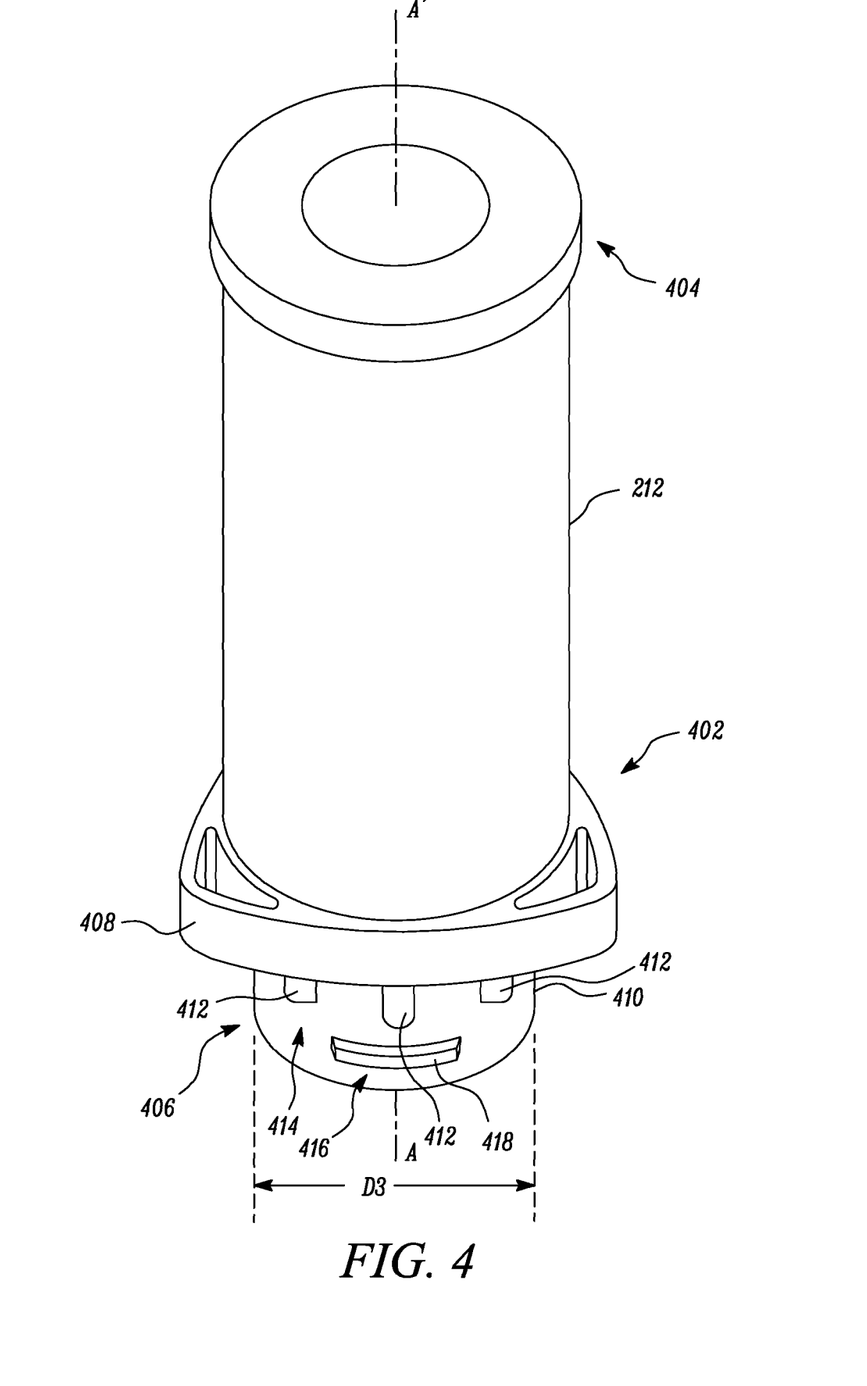
FIG. 4 illustrates a perspective view of a fluid strainer used with the hydraulic fluid tank assembly.

FIG. 4 illustrates a perspective view of the strainer 212 of the strainer assembly 214, according to an embodiment of the present disclosure. As shown in FIG. 4, the strainer 212 is a cylindrical structure having a longitudinal axis A-A'. Although the shape of the strainer 212 is shown to be cylindrical, this shape is merely exemplary and may be varied. As shown in FIG. 4, the strainer 212 includes a front end 402 and a rear end 404 defined along the longitudinal axis A-A' of the fluid strainer 212.

The strainer 212 includes a locking assembly 406 configured to secure the strainer 212 to the access plate 206. For example, the locking assembly 406 is positioned at the front end 402 of the strainer 212. In an embodiment of the present disclosure, the locking assembly 406 may be integrally formed with or mounted to the front end 402 of the strainer 212. In an alternative embodiment, the locking assembly 406 may be detachably mounted to the front end 402 of the strainer 212.

The locking assembly 406 includes a head portion 408 and a body portion 410. The head portion 408 secures the locking assembly 406 to the strainer 212. In an example, the head portion 408 may be integrally formed with or mounted to the front end 402 of strainer 212. In another example, the head portion 408 may include a receptacle structure to receive the front end 402 of the strainer 212 to detachably mount the locking assembly 406 to the strainer 212. The head portion 408 includes a polygon shaped structure extending radially from a circumference of the strainer 212, which as shown in FIG. 4, may be triangle shaped.

As shown in FIG. 4, the body portion 410 of the locking assembly 406 includes a number of longitudinal protruded portions 412 provided on an outer surface 414 of the body portion 410 and extending axially downward from the head portion 408 of the locking assembly 406. The longitudinal protruded portions 412 may be configured to facilitate securing of the locking assembly 406 within the elongated cavity 304 of the access plate 206.

The locking assembly 406 includes an engagement structure 416 provided on the outer surface 414 of the body portion 410. The engagement structure 416 is configured to engage with the stopper structure 324 provided on the inner surface 326 of the elongated cavity 304 to secure the strainer 212 within the elongated cavity 304 of the access plate 206, thereby restricting an axial movement of the strainer 212 with respect to the access plate 206.

The engagement structure 416 includes a plurality of protruded portions 418 circumferentially arranged on the outer surface 414 of the body portion 410. The plurality of protruded portions 418 are configured to engage within the respective retainer structure 332 of the stopper structure 324 provided on the access plate 206. In one example, the engagement structure 416 includes two protruded portions (only one shown in FIG. 4) spaced apart and positioned diametrically opposite to each other. As shown in FIG. 4, the pair of protruded portions 418 may be provided substantially perpendicular to the longitudinal axis A-A' of the strainer 212. It may be contemplated that the number, shape, structure and positioning of the at least one pair of protruded portions 418 as shown in FIG. 4 is merely exemplary and may be varied to achieve similar results.

According to an embodiment of the present disclosure, the locking assembly 406 is made of same material as that of the access plate 206. Examples of the material used for making the access plate 206 and the locking assembly 406 may include, but not limited to, metal, plastics and the like.

Figure 5A:
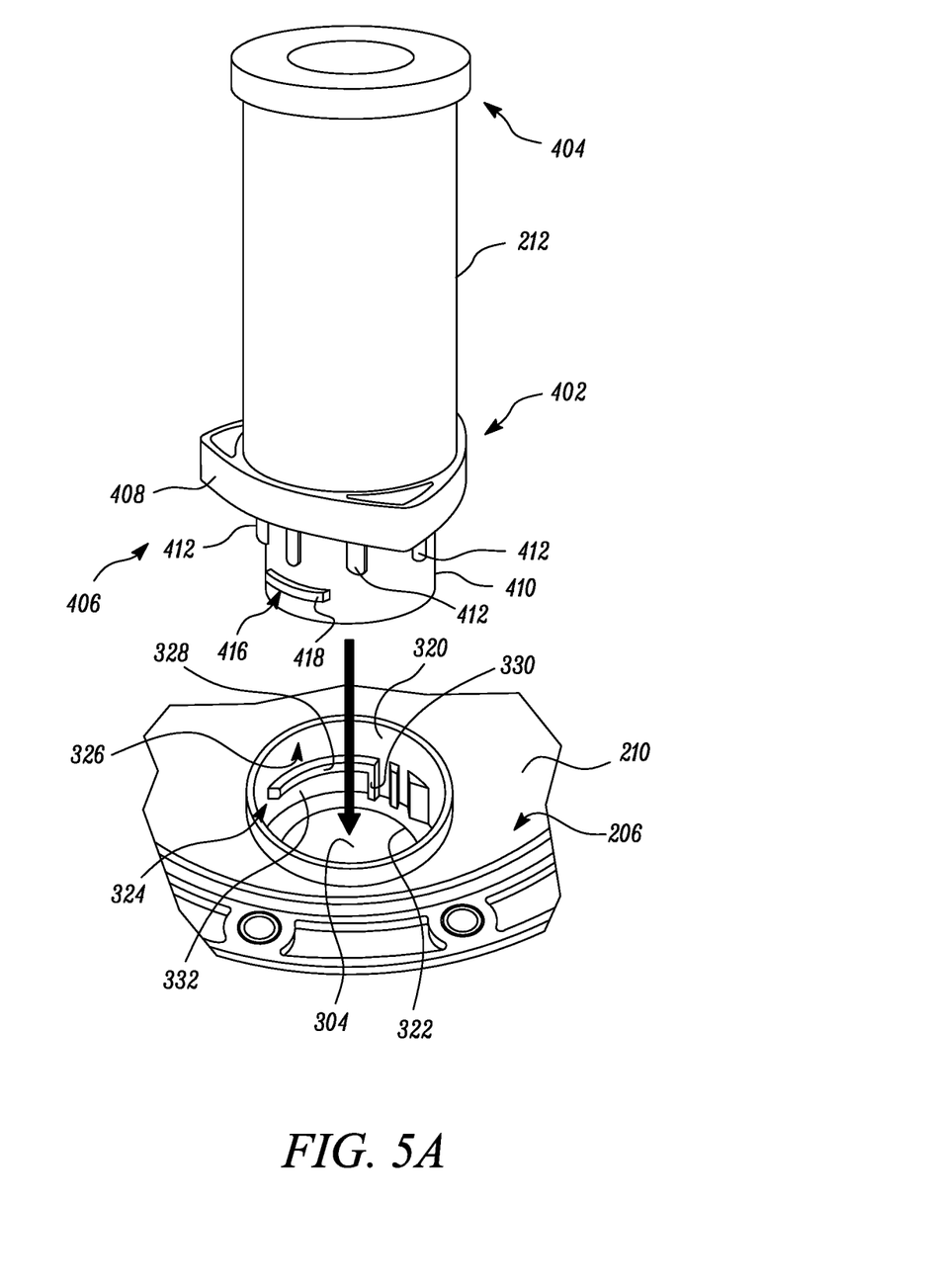
FIGS. 5A to 5B illustrate steps for securing the fluid strainer to the access plate to form a strainer assembly.
Figure 5B:
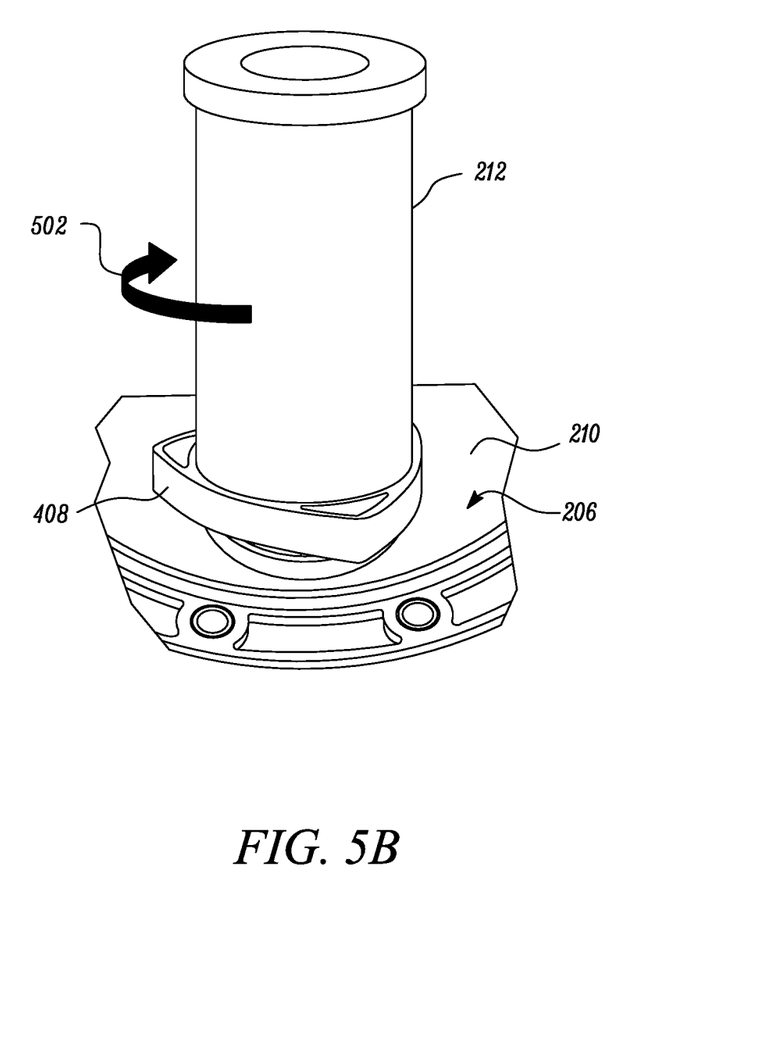
Figure 5C:
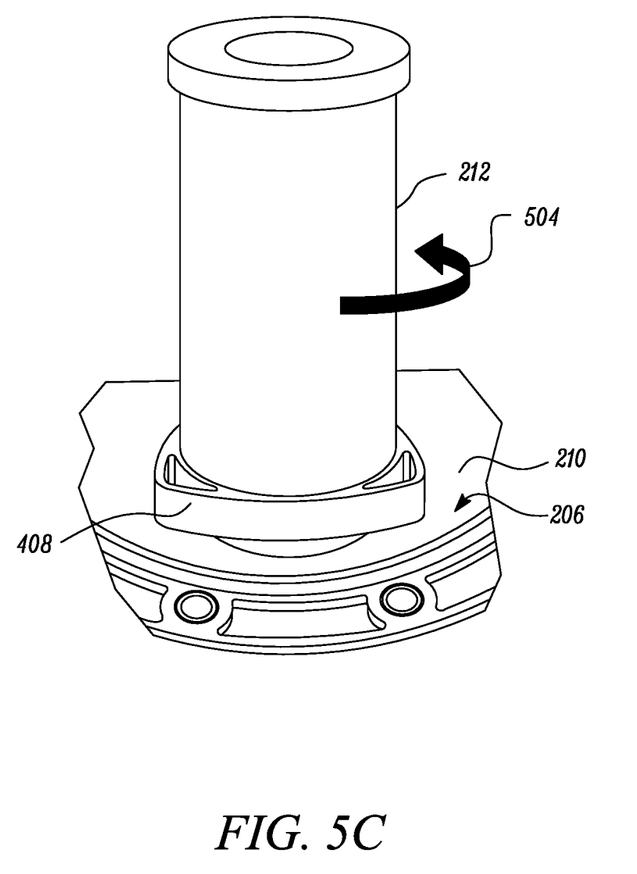
FIG. 5C illustrates removing the fluid strainer from the access plate.

The detailed explanation of securing and removing the strainer 212 with respect to the access plate 206 is provided with reference to FIGS. 5A to 5C.

INDUSTRIAL APPLICABILITY

FIGS. 5A to 5B illustrate the stages for securing the strainer 212 with the access plate 206 to form the strainer assembly 214, according to the embodiments of the present disclosure. As shown in FIG. 5A and FIG. 5B, the body portion 410 of the locking assembly 406 is positioned within the first portion 320 of the elongated cavity 304 (as shown in FIG. 5A) and rotated in a first direction 502 (as shown in FIG. 5B), to engage the pair of protruded portions 418 within the respective stopper structure 324 provided on the inner surface 326 of the elongated cavity 304.

For example, an outer diameter D3 of the body portion 410 is less than the inner diameter D1 of the elongated cavity 304 at the first portion 320 and greater than the inner diameter D2 of the elongated cavity 304 at the second portion 322. Further, a length of the body portion 410 may be less than the length of the first portion 320 of the elongated cavity 304. The body portion 410 of the locking assembly 408 is positioned within the first portion 320.

As explained above, the stopper structure 324 includes the first stopper member 328 and the second stopper member 330 to define the retainer structure 332. In an embodiment of the present disclosure, the plurality of protruded portions 418 of the locking assembly 406 are retained within the respective retainer structure 332 of the stopper structure 324 of the access plate 206 to secure the strainer 212 with the access plate 206 and restrict the axial movement of the strainer 212 with respect to the access plate 206. As shown, the perpendicular placement of second stopper member 330 with respect to the first stopper member 328 restricts further rotation of the locking assembly 406 in the first direction 502.

When the locking assembly 406 is secured within the elongated cavity 304 of the access plate 206, the head portion 408 abuts the inner portion 210 of the access plate 206. The longitudinal protruded portions 412 abut the inner surface 326 of the first portion 320 of the elongated cavity 304 to align the body portion 410 inside the elongated cavity 304. For example, the polygonal shape of the head portion 408 interferes with the fluid tank 202 in order to prevent strainer 212 from coming out of the elongated cavity 304. As shown in FIG. 2, the head portion 408 is concentric with the access plate 206 such that when the head portion 408 is rotated, it interferes with the inside of the fluid tank 120, thereby restricting rotational movement of the head portion 408 and the locking assembly 406.

Further, the locking assembly 406 of the strainer 212 may be rotated in a second direction 504 which is opposite to the first direction 502, as shown in FIG. 5C, to unlock the locking assembly 406 and remove the strainer 212 from the access plate 206. As explained above, the strainer 212, the locking assembly 406 and the access plate 206 together form the strainer assembly 214. The strainer assembly 214 as described in accordance with the various embodiment of the present disclosure provides a leak proof connection of the strainer 212 with the access plate 206. There is no additional O-ring required to secure the strainer 212 with the access plate 206. Moreover, the locking assembly 406 provides an easy installation of the strainer 212 and also facilitates easy removal of the strainer 212 from the access plate 206 for servicing purposes. Additionally, no heavy tools are required to install the fluid strainer 212.

Although the illustrated embodiments and the detailed description is written to have the stopper structure 324 on the inner surface 326 of the elongated cavity 304 and the engagement structure 416 on the body portion 410 of the locking assembly 406, it may be contemplated that the vice-versa may also be realized without deviating from the scope of the claimed subject matter. In such a scenario, the body portion 410 may include a stopper structure and the elongated cavity 304 may include an engagement structure which engages with the stopper structure of the body portion 410 of the locking assembly 406 to secure the strainer 212 within the elongated cavity 304 of the access plate 206.

The detailed description of exemplary embodiments of the disclosure herein makes reference to the accompanying drawings and figures, which show the exemplary embodiments by way of illustration only. While these exemplary embodiments are described in sufficient detail to enable those skilled in the art to practice the disclosure, it should be understood that other embodiments may be realized and that logical and mechanical changes may be made without departing from the spirit and scope of the disclosure. It will be apparent to a person skilled in the art that this disclosure can also be employed in a variety of other applications. Thus, the detailed description herein is presented for purposes of illustration only and not of limitation.

It may be further noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to affect such feature, structure, or characteristic in connection with other embodiments whether or not explicitly described.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A strainer assembly for a hydraulic fluid tank, the strainer assembly comprising:
   an access plate for covering an opening in a sidewall of the fluid tank, the access plate having an outer face, an inner face opposite the outer face, an elongated cavity with opposing open ends and for allowing fluid to pass through the access plate, and a stopper structure provided on an inner surface of the elongated cavity; and
   a strainer having a locking assembly for securing the strainer directly to the access plate from a side of the access plate corresponding to the inner face, such that the strainer is positioned inside the fluid tank, the locking assembly including:
   a head portion; and
   a body portion having an engagement structure,
   wherein the body portion of the locking assembly is positioned inside the elongated cavity of the access plate such that an inner face of the head portion of the locking assembly abuts the inner face of the access plate, the engagement structure engages with the stopper structure to restrict an axial movement of the strainer, and the body portion of the locking assembly is radially offset from said sidewall of the fluid tank.

2. The strainer assembly as claimed in claim 1, wherein the stopper structure includes:
   a first stopper member; and
   a second stopper member angularly positioned with respect to the first stopper member to form a retainer structure to engage the engagement structure of the locking assembly.

3. The strainer assembly as claimed in claim 1, wherein the elongated cavity has a first portion and a second portion such that an inner diameter of the elongated cavity at the first portion is greater than an inner diameter of the elongated cavity at the second portion.

4. The strainer assembly as claimed in claim 3, wherein an outer diameter of the body portion is less than the inner diameter of the elongated cavity at the first portion and greater than the inner diameter of the elongated cavity at the second portion.

5. The strainer assembly as claimed in claim 1, wherein the engagement structure includes a plurality of protruded portions circumferentially arranged on an outer surface of the body portion.

6. The strainer assembly as claimed in claim 1, wherein the locking assembly further includes a plurality of longitudinal protrusions provided on the body portion and being configured to abut the inner surface of the elongated cavity.

7. The strainer assembly as claimed in claim 1, wherein the head portion includes a polygon shape radially extending from a circumference of the strainer.

8. The strainer assembly as claimed in claim 1, wherein the locking assembly of the strainer is rotated in a first direction to engage the engagement structure with the stopper structure and in a second direction to disengage the engagement structure from the stopper structure.

9. A fluid tank assembly comprising:
   a fluid tank having an opening in a sidewall thereof;
   an access plate secured to cover the opening, the access plate having an outer face, an inner face opposite the outer face, an elongated cavity with opposing open ends and for allowing fluid to pass through the access plate, and a stopper structure provided on an inner surface of the elongated cavity; and
   a strainer positioned inside the fluid tank, the strainer having a locking assembly for securing the strainer directly to an inner portion of the access plate from a side of the access plate corresponding to the inner face, such that the locking assembly is positioned inside the fluid tank, the locking assembly including:
   a head portion; and
   a body portion having an engagement structure extending radially from an outer surface of the body portion,
   wherein the body portion of the locking assembly is positioned inside the elongated cavity of the access plate such that an inner face of the head portion of the locking assembly abuts the inner face of the access plate, the engagement structure engages with the stopper structure to restrict an axial movement of the strainer with respect to the access plate, and the body portion of the locking assembly is radially offset from said sidewall of the fluid tank.

10. The fluid tank assembly as claimed in claim 9, wherein the stopper structure includes:
    a first stopper member; and
    a second stopper member angularly positioned with respect to the first stopper member to form a retainer structure to engage the engagement structure of the locking assembly.

11. The fluid tank assembly as claimed in claim 9, wherein the elongated cavity has a first portion and a second portion such that an inner diameter of the elongated cavity at the first portion is greater than an inner diameter of the elongated cavity at the second portion.

12. The fluid tank assembly as claimed in claim 11, wherein an outer diameter of the body portion is less than the inner diameter of the elongated cavity at the first portion and greater than the inner diameter of the elongated cavity at the second portion.

13. The fluid tank assembly as claimed in claim 9, wherein the engagement structure includes a plurality of protruded portions circumferentially arranged on an outer surface of the body portion.

14. The fluid tank assembly as claimed in claim 9, wherein the locking assembly further includes a plurality of longitudinal protrusions provided on the body portion and being for abutting the inner surface of the elongated cavity.

15. The fluid tank assembly as claimed in claim 9, wherein the head portion includes a polygon shape radially extending from a circumference of the strainer.

16. The fluid tank assembly as claimed in claim 9, wherein the strainer is rotated in a first direction to engage the engagement structure with the stopper structure and in a second direction to disengage the engagement structure from the stopper structure.

17. The fluid tank assembly as claimed in claim 9, wherein a side face of the head portion of the locking assembly that is perpendicular to the inner face of the head portion directly contacts a radially inward facing surface of the sidewall defining the opening of the sidewall of the fluid tank.

18. A strainer assembly for a fluid tank, the strainer assembly comprising:
    an access plate for covering an opening in a sidewall of the fluid tank, the access plate including an outer face, an inner face opposite the outer face, an elongated cavity with opposing open ends and for allowing fluid to pass through the access plate, and a stopper structure having a first stopper member and a second stopper member provided on an inner surface of the elongated cavity, the first and the second stopper member being angularly positioned with respect to each other to form a retainer structure; and a strainer having a locking assembly for securing the strainer directly to an inner portion of the access plate from a side of the access plate corresponding to the inner face, such that the strainer is positioned inside the fluid tank, the locking assembly including:

a head portion; and a body portion having an engagement structure extending radially from an outer surface of the body portion, wherein the body portion of the locking assembly is positioned inside the elongated cavity of the access plate such that an inner face of the head portion of the locking assembly abuts the inner face of the access plate, the engagement structure engages with the retainer structure of the stopper structure to restrict an axial movement of the strainer with respect to the access plate, and the body portion of the locking assembly is radially offset from said sidewall of the fluid tank.

\* \* \* \* \*